United States Patent

Choi

Patent Number: 5,956,814
Date of Patent: Sep. 28, 1999

[54] BAND CABLE CAPABLE OF EASILY BEING BOUND AND RELEASED

[76] Inventor: Woncheol Choi, Kalak town #104-306, 1161-2, Hadan 2 dong, Shaha-ku, Pusan, 604-022, Rep. of Korea

[21] Appl. No.: 09/185,862

[22] Filed: Nov. 4, 1998

[30] Foreign Application Priority Data

Nov. 3, 1997 [KR] Rep. of Korea ............ 97-31731

[51] Int. Cl.[6] ............................................. B65D 63/00
[52] U.S. Cl. .................. 24/16 PB; 24/17 AP; 24/30.5 P
[58] Field of Search .............. 24/16 PB, 17 AP, 24/30.5 P

[56] References Cited

U.S. PATENT DOCUMENTS

| | | | |
|---|---|---|---|
| 4,490,886 | 1/1985 | Omata | 24/16 PB |
| 4,944,475 | 7/1990 | Ono et al. | 24/16 PB |
| 5,224,244 | 7/1993 | Ikeda et al. | 24/16 PB |
| 5,774,944 | 7/1998 | Choi | 24/16 PB |

*Primary Examiner*—Victor N. Sakran
*Attorney, Agent, or Firm*—Notaro & Michalos P.C.

[57] ABSTRACT

A band cable comprising a tie having a plurality of grooves, a head having a tie passing slot into which the tie is inserted, and a stopper located in a one-body with the tie passing slot to fixedly secure the tie, is characterized in that there is formed in both sides of the tie passing slot an inclined path which makes the stopper separated from the groove of the tie, in case that a sort of force is given in one part of the tie so as to release the tie under such as a situation that the tie is bound by the tie passing slot of the head.

1 Claim, 2 Drawing Sheets

BAND CABLE CAPABLE OF EASILY BEING BOUND AND RELEASED

BACKGROUND OF THE INVENTION

1. Field of the Invention

The present invention relates to a band cable that can be used to bind several cables together, and more particularly to a band cable capable of easily releasing the cables bound together.

2. Discussion of Related Art

In general, the band cable has been used for firmly binding a bunch of cables or pipes together, so that the band cable could be utilized in a proper place of the inside of all kinds of structures, machines, or cars. And, sometimes it is needed to release the band cable bound together. However, the band cable according to the prior art can not be released until it is cut by things such as a nipper. Therefore, when a user wants to use the band cable in accordance with the prior art, he/she has to get a new one, not the cable under use. So, the band cable according to the prior art, is not economical.

Thus, the band cable which is designed to solve the problem, has the following structure. As shown in FIG. 4, the band cable has a groove 54 in a head 10 which is located just above a stopper 52, so that a knob 50 in which the stopper 52 is formed is designed to be lifted. In other words, in case that the user decides to release the band cable under such as a situation that a tie 12 is bound, the user should lift up the knob 50 by using the tip of the finger nail of his/her one hand, and at the same time he/she should pull out the tie 12 from a tie passing slot 18 of the head 10 with his/her other hand. But, if the user does not want to use his/her finger nail, in the band cable according to the prior art, there has arisen an inconvenience in that he/she should use something sharp or thin instead. Thus, in accordance with the prior art, there arises a problem that the user must use his/her own both hands to release the band cable. Further, in the band cable of the prior art, there arises another problem in that the bottom part of the knob 50 is so flexibly contacted with the top of the tie 12 that the user's finger nail or the sharp thing can't easily go thereinto.

SUMMARY OF THE INVENTION

Therefore, an object of the present invention is to provide a band cable capable of easily being bound/released after a various kind of cables or pipes are bound together, if needed.

Additional features and advantages of the invention will be set forth in the description, or may be learned by practice of the invention. The objective and other advantages of the invention will be realized and attained by the structure particularly pointed out in the written description and claims hereof as well as the appended drawings.

To achieve the above object in accordance with the present invention, as embodied and broadly described, the band cable comprises a tie having a plurality of grooves, a head having a tie passing slot into which the tie is inserted, and a stopper located in a one-body with the tie passing slot to fixedly secure the tie. The band cable of the present invention is characterized in that there is formed in both sides of the tie passing slot an inclined path which makes the stopper separated from the groove of the tie, in case that a sort of force is given in one part of the tie so as to release the tie under such as a situation that the tie is bound by the tie passing slot of the head.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain he principles of the invention:

DETAILED DESCRIPTION OF PREFERRED EMBODIMENT

Reference will now be made in detail to the preferred embodiments of the present invention, examples of which are illustrated in the accompanying drawings. In the following description, numerous specific details are set forth to provide a more thorough understanding of the present invention. It will be apparent, however, to one skilled in the art that the present invention may be practiced without these specific details. In other instance, well known functions on construction which may obscure the invention in unnecessary detail are not described in detail.

Figure 1:
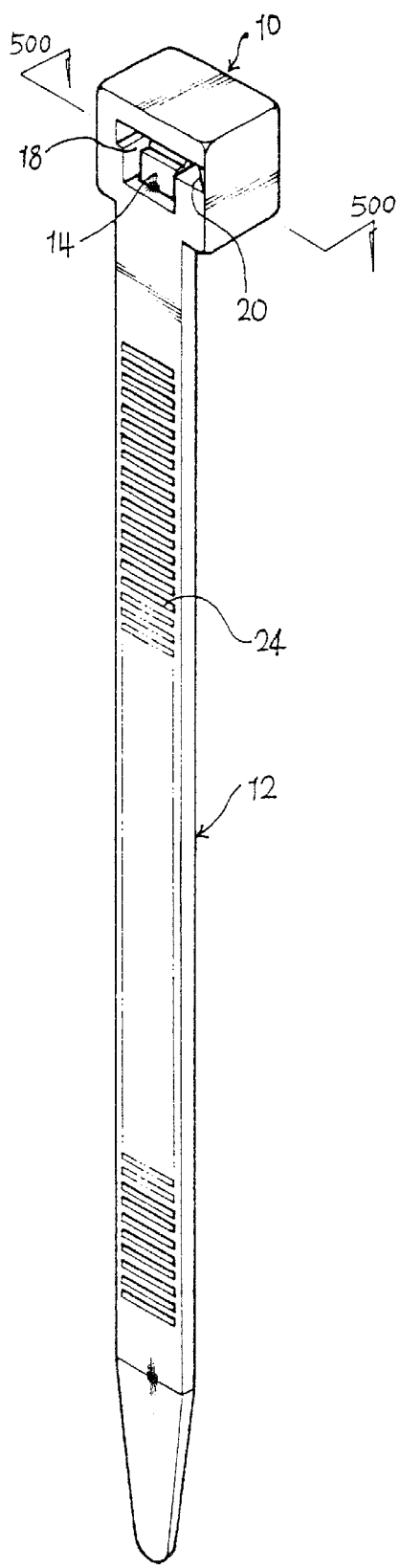
FIG. 1 is a prospect view illustrating a band cable capable of easily being bound/released in accordance with one preferred embodiment of the present invention.
Figure 2:
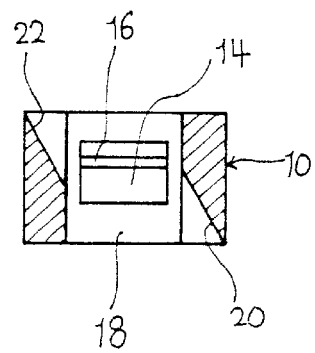
FIG. 2 is across-sectional view along a line "500–500" in FIG. 1.

FIGS. 1 and 2 are views illustrating the band cable which is easily bound or released according to the preferred embodiment of the present invention. Referring to FIGS. 1 and 2, the band cable comprises a tie 12 for binding a various kind of cables or pipers, and a head 10 formed in a one-body with the tie 12. The tie 12 has a plurality of grooves 24 which are located in a regularly interval. There is formed in the head 10 a tie passing slot into which the tie 12 is inserted. There is also formed a knob 14 having a stopper 16 in the bottom part of the tie passing slot 18. The stopper 16 is coupled with the groove 24 to fixedly secure the tie 12 into the tie passing slot 18. Further, there are formed in the both sides of the tie passing slot 18 inclined paths 20 and 22 which make the tie 12 released easily. That is, as shown in FIG. 2, the inclined paths 20 and 22 are cross to each other to thereby keep themselves in a parallel. More in detail, the inclined path 20 is inclined at the right side and the other at the left side.

Figure 3:
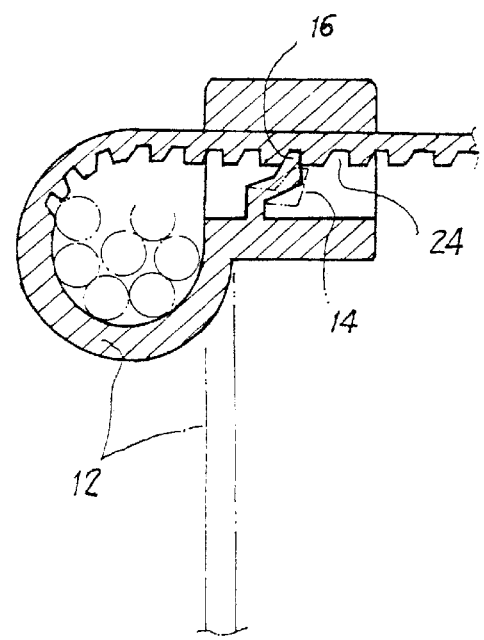
FIG. 3 is lateral view illustrating a state that the band cable according to the present invention is being bound.

Referring to FIGS. 3 and 4, the band cable according to the present invention will be explained hereinafter.

Figure 4A:
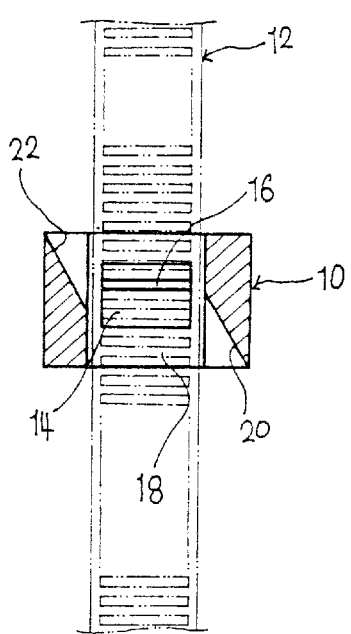
FIGS. 4a and 4b are cross-sectional views illustrating other state that the band cable according to the present invention is being released.

First of all, when a user wants to bind a various kind of cables or pipes by using the band cable according to the present invention, the user is intended to insert the end edge of the tie 12 into the tie passing slot 18 of the head 10 after wrapping several cables in an opposite direction of the groove 24. Then, the stopper 16 is inserted into the groove 24 of the tie 12, when the tie 12 inserted into the tie passing slot 18 is pulled until it can not be pulled any more. As shown in FIGS. 3 and 4a, the stopper is fixedly secured into the tie passing slot 18, thereby binding many band cables (pipes) together.

Figure 4B:
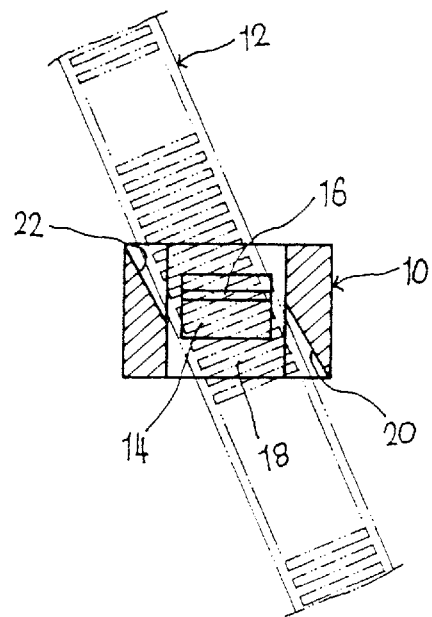
Figure 5:
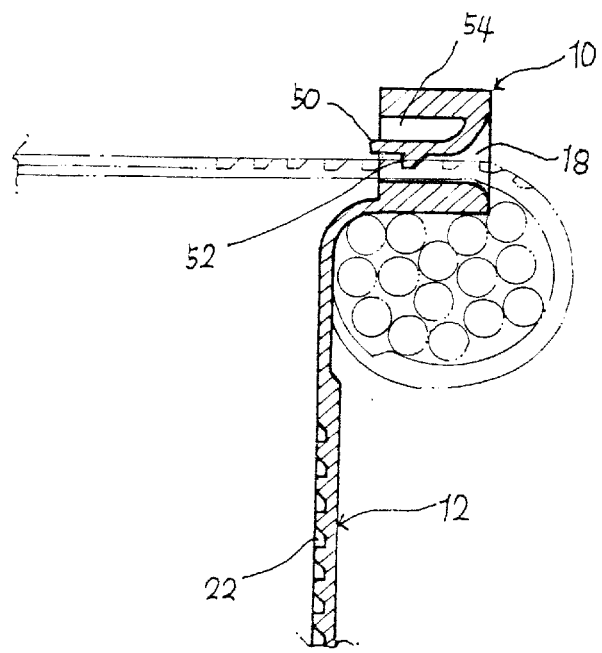
FIG. 5 lateral cross-sectional view illustrating a structure of the band cable according to the prior art.

On the other hand, when the user wants to release a plurality of cables, as shown in FIG. 4a, if a sort of force is given in one side of the tie 12, it is twisted as shown in FIG. 4b. Thereby, the knob 14 attached to the head 10 receives some strength and get bent down. The stopper 16 is away from the groove 24 of the tie 12, and is then positioned between the inclined paths 20 and 22 of the both sides of the tie 12. Thereafter, under a situation that the both sides of the tie 12 is contacted with the inclined paths 20 and 22, if the tie 12 is pushed back, the tie 12 begins to move along the inclined paths 20 and 22. Also, if the tie 12 is pushed continuously, it is separated from the tie passing slot 18, so that the band cable is released.

As mentioned above, if the user intends to release the cables bound by the band cables according to the present invention, the tie 12 is separated from the tie passing slot 1 8, in case of keeping the tie inclined and pulling it. Therefore, an additional something sharp or thin is not necessary to release the band cable. Also, the user doesn't need to use the tip of his/her finger nail by force. Accordingly, in the band cable of the present invention, there is provided an efficiency in that the user can have the reliability on the product with an easy and simple release method.

It will be apparent to those skilled in the art that various modifications and variations can be made in the band cable of the present invention without departing from the spirit or scope of the invention.

What is claimed is:

1. A band cable comprising a tie having a plurality of grooves, a head having a tie passing slot into which said tie is inserted, and a stopper located in a one-body with said tie passing slot to fixedly secure said tie, is characterized in that there is formed in both sides of said tie passing slot an inclined path which makes said stopper separated from said groove of said tie, in case that a sort of force is given in one part of said tie so as to release said tie under such as a situation that said tie is bound by said tie passing slot of said head.

* * * * *